United States Patent

Schiffleger et al.

[11] Patent Number: 6,098,162
[45] Date of Patent: *Aug. 1, 2000

[54] VECTOR SHIFT FUNCTIONAL UNIT FOR SUCCESSIVELY SHIFTING OPERANDS STORED IN A VECTOR REGISTER BY CORRESPONDING SHIFT COUNTS STORED IN ANOTHER VECTOR REGISTER

[75] Inventors: Alan J. Schiffleger, Chippewa Falls; Ram K. Gupta; Christopher C. Hsiung, both of Eau Claire, all of Wis.

[73] Assignee: Cray Research, Inc., Eagan, Minn.

[*] Notice: This patent is subject to a terminal disclaimer.

[21] Appl. No.: 09/138,613

[22] Filed: Aug. 24, 1998

Related U.S. Application Data

[63] Continuation of application No. 08/521,566, Aug. 30, 1995, Pat. No. 5,848,286, which is a continuation of application No. 08/218,997, Mar. 29, 1994, Pat. No. 5,481,746.

[51] Int. Cl.[7] ........................................ G06F 9/15
[52] U.S. Cl. .................. 712/4; 712/2; 712/5; 712/14; 712/25; 712/27; 712/1
[58] Field of Search ................... 712/1, 2, 3, 4, 712/5, 6, 8, 9, 21, 20, 18, 25, 27, 14

[56] References Cited

U.S. PATENT DOCUMENTS

| | | | |
|---|---|---|---|
| 3,914,744 | 10/1975 | Brown | 340/172 |
| 4,128,880 | 12/1978 | Cray | 395/700 |
| 4,223,391 | 9/1980 | Barnes | 395/800 |
| 4,636,942 | 1/1987 | Chen et al. | 395/200 |
| 4,661,900 | 4/1987 | Chen et al. | 364/200 |
| 4,725,973 | 2/1988 | Matsura et al. | 364/736 |
| 4,754,398 | 6/1988 | Pribnow | 364/200 |
| 4,760,545 | 7/1988 | Inagami et al. | 364/200 |
| 4,773,006 | 9/1988 | Kinoshita et al. | 364/200 |
| 4,779,192 | 10/1988 | Torii et al. | 712/8 |
| 4,825,361 | 4/1989 | Omoda et al. | 395/800 |
| 4,849,882 | 7/1989 | Aoyama et al. | 395/800 |
| 4,872,128 | 10/1989 | Shimizu | 364/715 |
| 4,888,682 | 12/1989 | Ngai et al. | 364/200 |
| 5,019,969 | 5/1991 | Izumisawa et al. | 395/800 |
| 5,099,445 | 3/1992 | Studor et al. | 364/715 |
| 5,170,370 | 12/1992 | Lee et al. | 364/736 |
| 5,175,862 | 12/1992 | Phelps et al. | 395/800 |
| 5,349,677 | 9/1994 | Cray et al. | 395/800 |
| 5,481,746 | 1/1996 | Schiffleger et al. | 395/800 |
| 5,513,336 | 4/1996 | Vishlitzky et al. | 711/136 |
| 5,848,286 | 12/1998 | Schiffleger et al. | 395/800.04 |

FOREIGN PATENT DOCUMENTS

| | | |
|---|---|---|
| 0167959 | 1/1986 | European Pat. Off. . |
| 0211179 | 2/1987 | European Pat. Off. . |
| 8909447 | 10/1989 | WIPO . |

OTHER PUBLICATIONS

"Bit–Serial SIMD on the CM–2 and the Cray 2", Smiley & Iobst, Supercomputing Research Center (no available date).

"PASSWORK User's Guide", Iobst & Turnbull, Supercomputing Research Center, Jun. 1989.

Primary Examiner—John A. Follansbee
Assistant Examiner—Dzung C. Nguyen
Attorney, Agent, or Firm—Schwegman, Lundberg, Woessner & Kluth, P.A.

[57] ABSTRACT

Vector shifting elements of a vector register by varying amounts in a single process is achieved in a vector supercomputer processor. A first vector register contains a set of operands, and a second vector register contains a set of shift counts, one shift count for each operand. Operands and shift counts are successively transferred to a vector shift functional unit, which shifts the operand by an amount equal to the value of the shift count. The shifted operands are stored in a third vector register. The vector shift functional unit also achieves word shifting of a predetermined number of vector register elements to different word locations of another vector register.

6 Claims, 11 Drawing Sheets

FIG. 2A

VECTOR SHIFT FUNCTIONAL UNIT FOR SUCCESSIVELY SHIFTING OPERANDS STORED IN A VECTOR REGISTER BY CORRESPONDING SHIFT COUNTS STORED IN ANOTHER VECTOR REGISTER

This application is a continuation of U.S. patent application Ser. No. 08/521,566, filed Aug. 30, 1995 now U.S. Pat. No. 5,848,286, which is a continuation of U.S. application Ser. No. 08/218,997 filed Mar. 29, 1994, now U.S. Pat. No. 5,481,746.

FIELD OF THE INVENTION

The present invention relates to vector register supercomputers, and, in particular, the present invention describes the implementation of bit-oriented vector instruction opcodes for fine grain data manipulation within a large grain vector register parallel processor supercomputer.

BACKGROUND OF THE INVENTION

Large grain vector processing computers are well known in the art. The term "large grain" used in the art refers to a parallel processing machine having a small number of fast processors. The term "fine grain", also called massively parallel, refers to a parallel processor computer sing a very large number of relatively slow processors. The single processor of the Cray-1 supercomputer produced by Cray Research, Inc., the assignee of the present invention, contains a plurality of vector registers each of which is adapted for holding a plurality of elements in an ordered set of data. These vector registers are typically one word wide by n words deep, where the word length is 64 bits. The vector registers are connected to a plurality of functional units which receive the vector operands for executing instructions in response to opcodes and which have outputs for delivering the results computed or processed by the functional units. The operands presented from the vector registers to the functional units and received as output from the functional units may be queued up in a mode of operation known as vector chaining to increase throughput of the functional units. By using chaining, more than one result can be obtained per clock period. A detailed description of the Cray-1 supercomputer architecture is contained in U.S. Pat. No. 4,128,880 which is assigned to the assignee of the present invention and which is hereby incorporated by reference.

Multiprocessing vector register supercomputers are known in the prior art which combine a plurality of vector register processors to operate in parallel and to share a common local memory. Interaction between the vector register processors is accomplished by common semaphore and information registers. To provide interprocessor communication between the multiple vector register processors, a plurality of semaphore registers and a plurality of information registers are accessed by any one of the processors to facilitate interprocessor communication. Each processor then uses a local control circuit to accomplish, among other things, coordination of processors whereby delays associated with communicating between processors are avoided. A system for multiprocessor communication between register processors is described in U.S. Pat. No. 4,754,398 assigned to the assignee of the present invention, and which is hereby incorporated by reference.

In multiprocessor vector register supercomputers, each processor accesses a central common memory through a plurality of memory reference ports. These ports are connected to a plurality of registers which are directly addressed by the processor. The registers are used for holding information which can be used by the processor as operands. The shared memory includes a memory access conflict resolution circuit which senses and prioritizes conflicting references to the central memory from the processors thereby eliminating memory access collisions by the processors. A detailed description of vector register multiprocessing control and memory access is described in U.S. Pat. No. 4,636,942 assigned to the assignee of the present invention, and which is hereby incorporated by reference.

Vector register supercomputers of the prior art are designed to operate on large grain data which is arranged as vectors. The vectors are typically 64 bits wide and n words deep where n depends upon the machine vector length capabilities. In the prior art, the Y-MP supercomputer produced by Cray Research, Inc., the assignee of the present invention, allows a vector register length of 64 words thereby allowing a vector of 1 word by 64 words. The functional units of a single processor of the Y-MP supercomputer operate on large grain operands contained in the vector registers which may be at the most 1 word by 64 words. The functional units operate on the vector operands to perform such operations as floating point multiply, floating point add, vector add, logical operations and other operations.

The Cray multiprocessing supercomputers accomplish parallel processing of data in a form commonly termed MIMD (Multiple Instruction stream/Multiple Data stream). The MIND process is the ability of a multiprocessor computer to simultaneously process different instructions operating on different data streams. The granularity of parallelism in the Cray vector processor machines is a word-wide minimum granule of data. Matrix mathematics performed on the Cray MIND machines uses 1-word width elements as the matrix elements. Matrix multiplication, therefore, is a serial process of operating on the 1-word wide elements of the matrix until all elements of the matrix have been processed to create a resultant matrix. Depending on the matrix operation, the MIMD architecture will allow plural processors to operate on portions of the matrix at any given time.

In contrast to this architecture, a SIMD (Single Instruction stream/Multiple Data stream) machine can process multiple data streams using the same set of instructions simultaneously. In a fine grain SIMD parallel architecture, each element of a matrix is processed by a single processor. The plurality of processors operating in parallel all execute the same instructions on the data at the same time to produce parallel results. If the number of processors equals the number of elements in a matrix, the entire matrix can be processed in parallel simultaneously.

The data granularity of parallelism and the number of processors in SIMD and MIMD architectures determine the speed at which the architecture can process a matrix problem. In the prior art, the Connection Machine CM-2 produced by Thinking Machines Corporation of Cambridge, Mass. is a fine grain SIMD architecture with 64K (65,536) processors that execute data in parallel operations. Each processor operates on a single bit of data and all processors execute the same instruction in parallel. This type of parallel operation is fast; however, the amount of external communications between executions is enormous and at least partially offsets the advantage of the massively parallel execution.

The CM-2 machine is a special purpose processor which requires a front-end or support processor to download the data for specialized execution. The support processor handles the user interface, executes the user's programs, handles the I/O with the CM-2 and performs the scalar operations. Additional communication time is required, therefore, to download the operation to the specialized CM-2 processor to take advantage of the massively parallel operation of the single bit processors. One of the contrasts between the Y-MP MIMD and CM-2 SIMD architectures is the granularity of parallelism. The Y-MP computer has 8 parallel processors operating on 64-bit words arranged as 64 word vectors. All 8 processors can simultaneously operate on different vector data streams. The CM-2 machine can operate on 64K (65,536) separate single-bit data streams; however, all processors execute the same instruction in parallel.

There is a need in the prior art, therefore, to implement SIMD-style bit manipulation instruction sets in large grain MIMD type computers to allow large grain MIMD-type computers to emulate fine grain SIMD operation. In this fashion, there is a need in the prior art for instructions which will treat vectors as a plurality of independent multiple data streams and operate on the data in those vectors in parallel. In particular, there is a need in the prior art for bit manipulation instructions in a MIMD-type machine. These can be used to accomplish SIMD-style operation on the data, among other things. For example, there is a need in the prior art for array operations which treat each element of the array as a single bit and operate on the entire array in parallel using MIMD architectures.

SUMMARY OF THE INVENTION

The present invention solves these and other shortcomings of the prior art described above. The present invention also solves other shortcomings of the prior art which will become apparent to those skilled in the art upon reading and understanding the present specification.

The present invention is a method and apparatus of providing bit manipulation of data in vector registers of a vector register machine. This capability will allow emulation of some portions of a SIMD architecture in a MIMD architecture style machine, among other things. The present invention shifts the contents of a vector register using another vector register as the shift count. Each element of the vector register which will be shifted has a different shift count, all the shift counts constituting the elements of another vector register. An increased degree of data manipulation is achieved by specifying the amount by which each element of a vector register will be shifted and containing all of those shift counts in a single vector register. Therefore, only a single instruction is required for the processor to execute the process of shifting all the elements of a vector by varying amounts.

Another operation of the present invention shifts a predetermined number of words in a vector register to different word locations of another vector register. Greater versatility of the hardware is thus achieved. A preferred embodiment of the present invention is a C-90 supercomputer, which is an upgraded version of the Y-MP supercomputer, manufactured by Cray Research, Inc., the assignee of the present invention.

BRIEF DESCRIPTION OF THE DRAWINGS

In the drawings where like numerals refer to like components throughout several views.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Figure 1A:
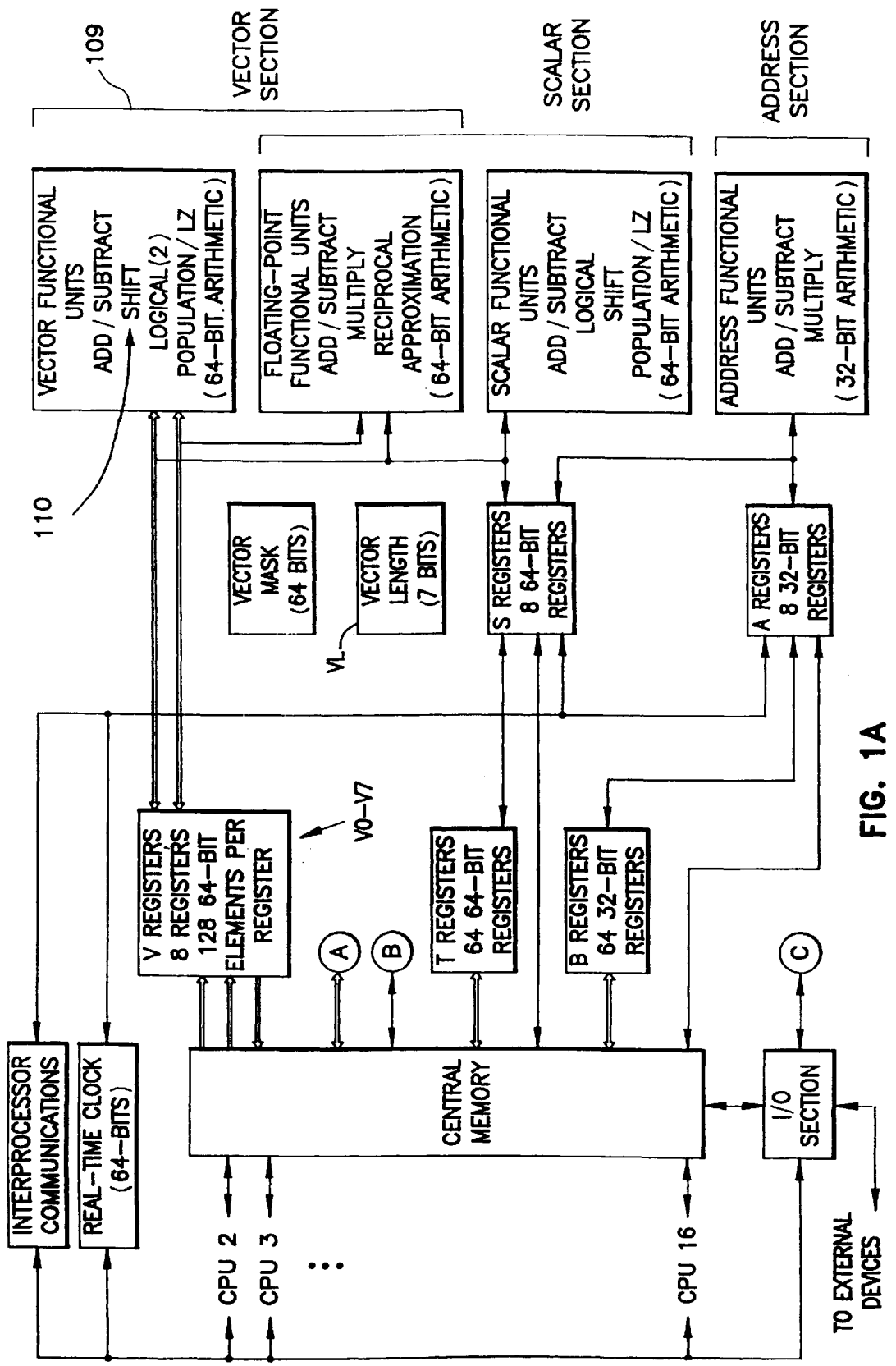
FIG. 1 is a simple block diagram of single processor in the Cray Research C-90 vector register supercomputer.
Figure 1B:
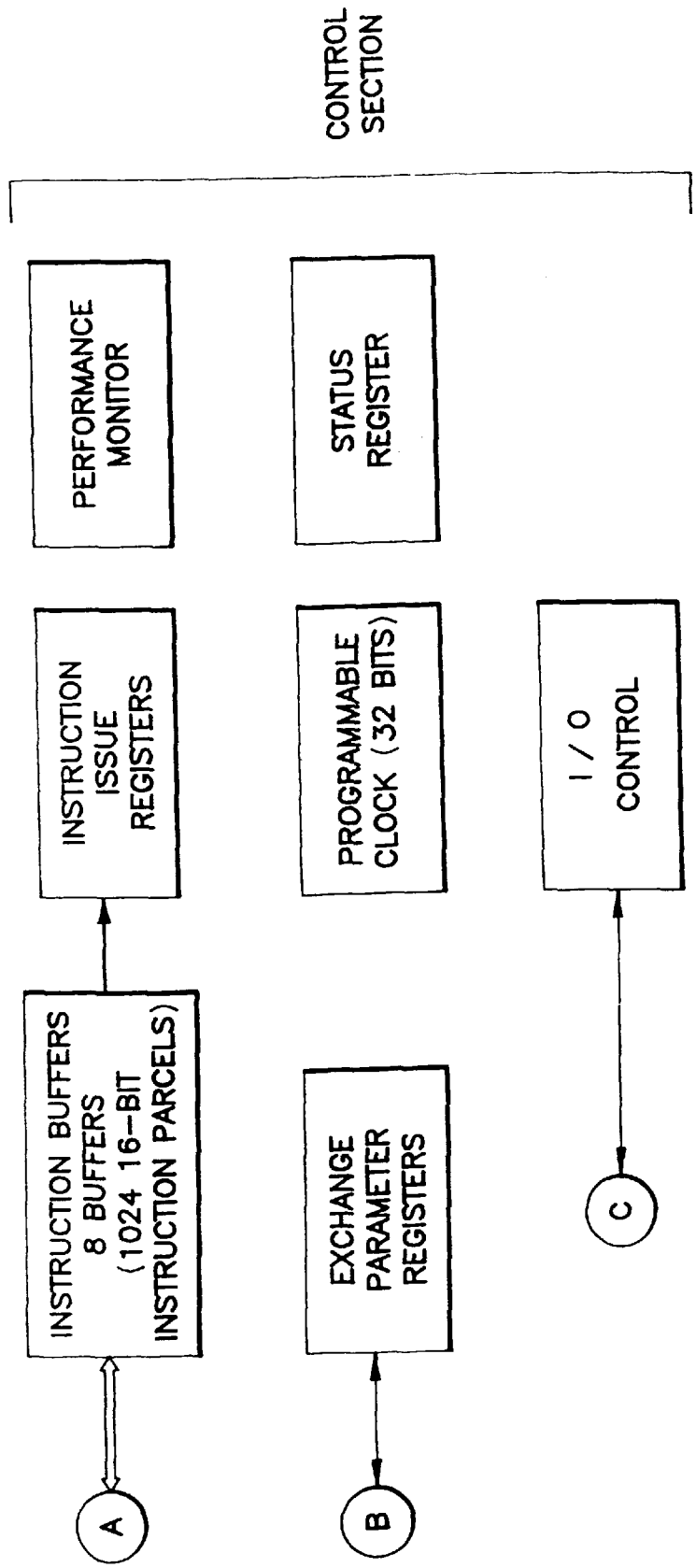
Figure 2A:
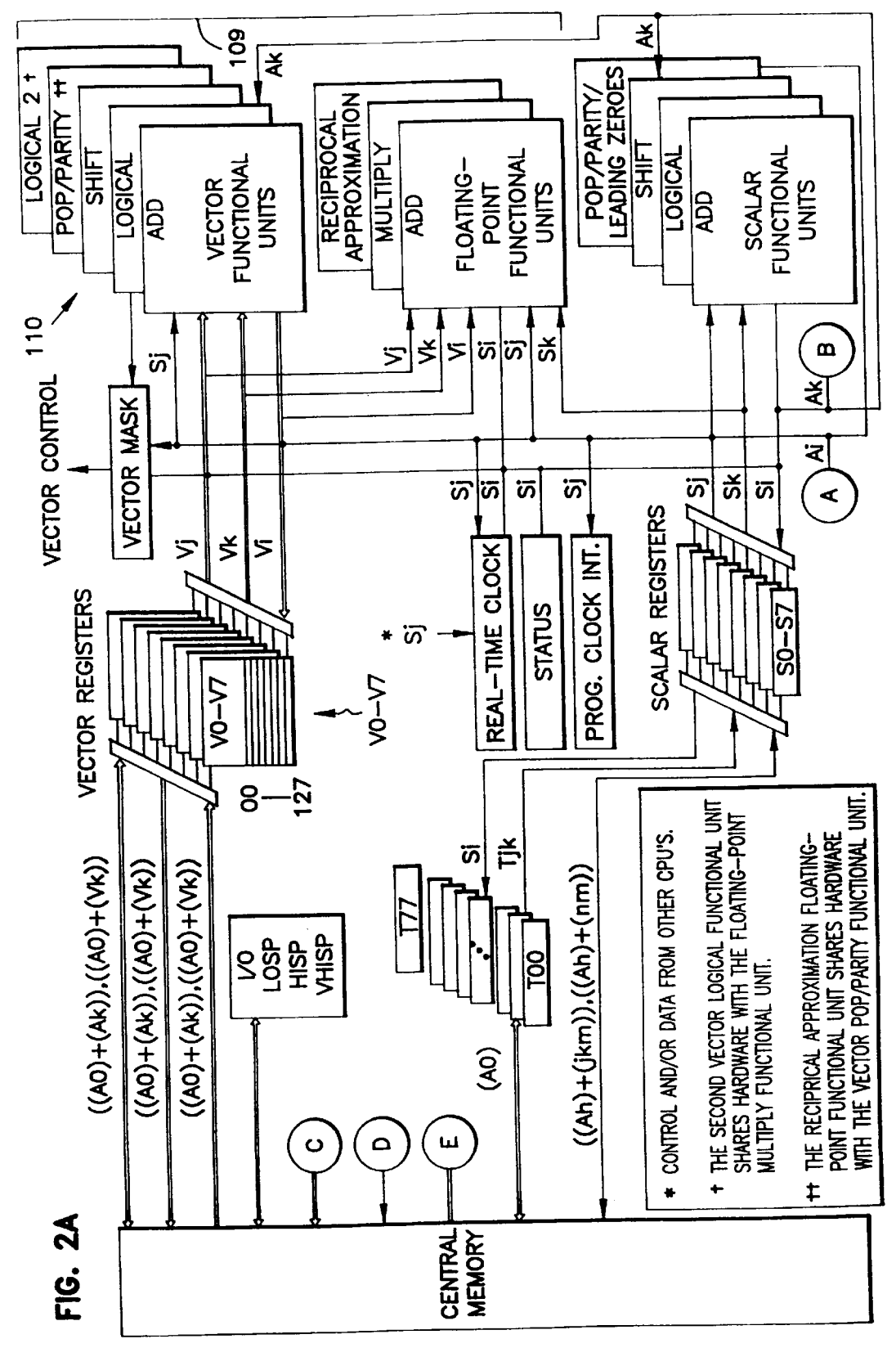
Figure 2B:
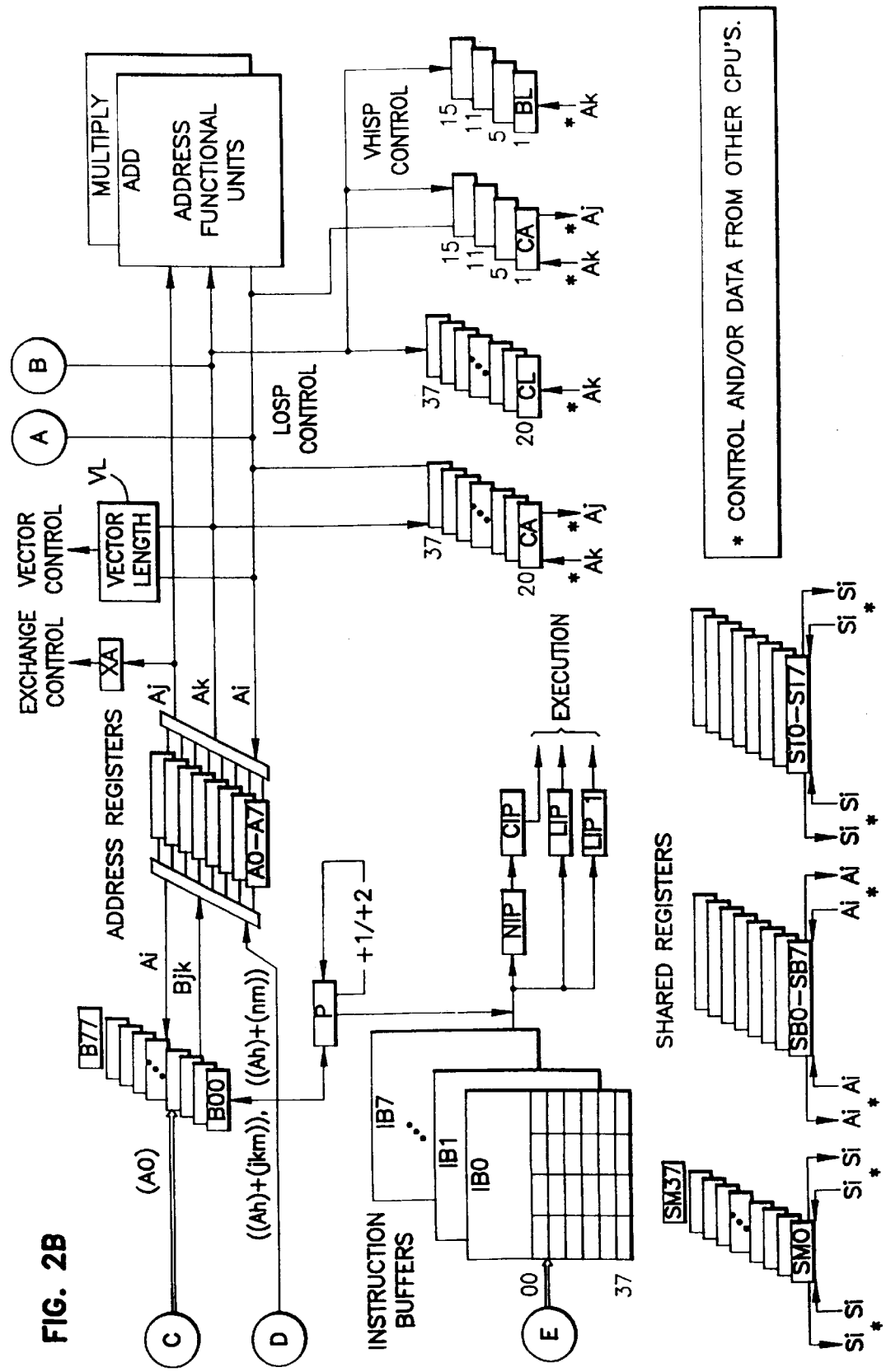
FIG. 2 is a detailed block diagram of a single processor in the Cray Research C-90 vector register supercomputer.

FIG. 1 is a simple block diagram of a single processor in a C-90 vector register supercomputer, which is a preferred embodiment of the present invention. FIG. 2 is a more detailed block diagram of the same processor. Each processor contains eight vector registers Vo–V7. The vector registers Vo-V7 each contain 128 words, each word consisting of 64 bits. For example, vector register Vo contains words Vo0-Vo127. The vector registers are interfaced to functional units 109 which perform various logical and arithmetic functions on data from the vector registers. The functional units are fully segmented with latches so that operands can be sent to a functional unit on successive clock periods. Therefore, during the execution of an instruction, each part of a functional unit may be operating on a different operand. Also, each functional unit may operate independent of the other functional units so that more than one result may be obtained from the functional units for each clock period. The use of vector registers, segmentation of functional units, and method of chaining, whereby more than one result may be achieved per clock period, are explained in detail in U.S. Pat. No. 4,128,880, which, as previously stated, is incorporated herein by reference.

As indicated in FIGS. 1 and 2, the C-90 vector register supercomputer is a two pipe machine. The two pipe feature of the C-90 supercomputer provides for increased speed by using additional data paths and operating on two operands in parallel in the vector functional units. A two pipe machine is one embodiment of the present invention, and one skilled in the art will recognize that other embodiments are possible without departing from the scope of the invention.

VECTOR SHIFT BY Vo SHIFT COUNT

The present invention expands the capabilities of the vector shift functional unit 110 by optionally using vector register Vo to contain the shift count, whereby the words of vector register Vj, which contains the operands, are shifted by amounts corresponding to the values of the words in vector register Vo. For example, the first word Vo0 of the vector register Vo is the shift count for the first word Vj0 of the source vector register Vj. It follows that there are 128 shift counts Vo0–Vo127 in vector register Vo which are used as the shift counts for each of the 128 words Vj0–Vj127 respectively in the source vector register Vj. The use of only vector register Vo to contain the shift count is the result of a hardware limitation within the C-90 supercomputer. One skilled in the art will recognize that other vector registers may be used to contain the shift count without departing from the scope of the invention.

The following are the opcodes in Cray Assembly Language (CAL) for the vector shift by Vo shift count instructions.

005400 150ij0 Vi, Vj<Vo                                    [1]

005400 151ij0 Vi, Vj>Vo                                    [2]

With instruction [1], vector register Vj is shifted left Vo places and then returned to vector register Vi. Instruction [2] causes vector register Vj to be shifted right Vo places with the result returned to vector register Vi. The value of bit ($2^9$) of the instruction thus determines whether the vector register containing the operands is shifted right or left. In the instruction, i represents bits ($2^6$–$2^8$), which indicate the destination vector register, and j represents bits ($2^3$–$2^5$), which indicate the source vector register. It is possible to set i equal to j in instructions [1] and [2] so that the source vector register Vj equals the destination vector register Vi.

Figure 3:
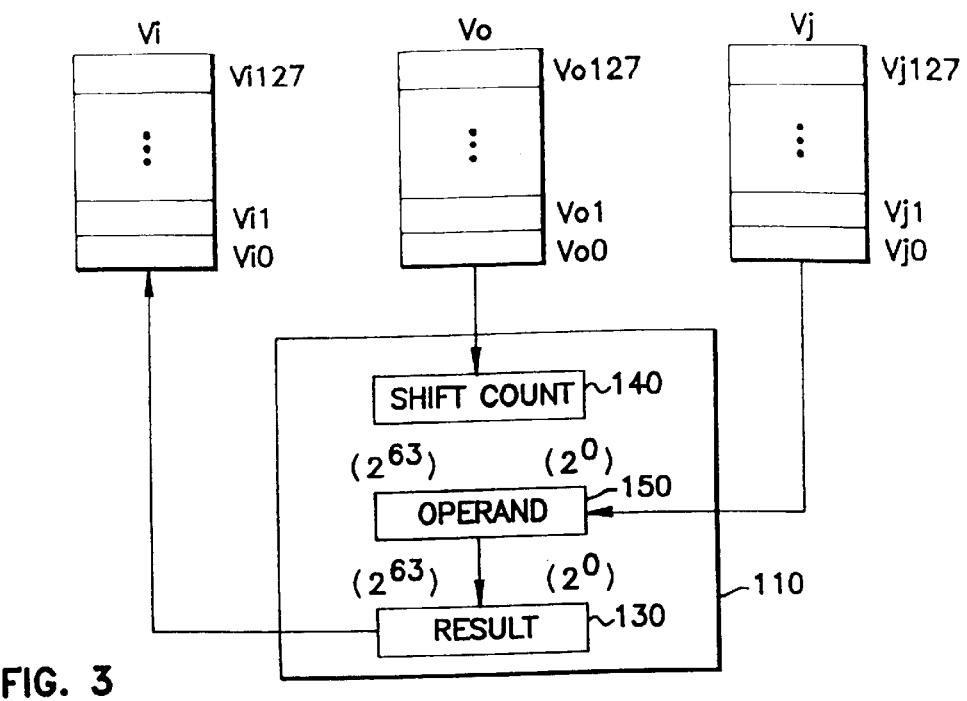
FIG. 3 is a block diagram of the conceptual operation of the vector shift by Vo shift count instruction for a left shift.

FIG. 3 shows conceptually the operation of the vector shift functional unit 110 for instruction [1], the left shift. Vector register Vj contains 128 words, Vj0–Vj127, which will be shifted left. Vector register Vo contains the shift counts, Vo0–Vo127, for each of the words in the vector register Vj. On each clock period, a word from vector register Vj, and a shift count from vector register Vo, are transferred to the vector shift functional unit 110. Logic within the vector shift functional unit 110 will left shift the word from vector register Vj by an amount equal to the value of the shift count from the vector register Vo. Subsequent to the shifting, the result is transferred to the vector register Vi. For example, shift count Vo0 and word Vj0 will be transferred to the vector shift functional unit 110 on two successive clock periods (CP0) and (CP1) respectively. On the next clock period (CP2), word Vj0 will be left shifted by an amount equal to the value of shift count Vo0. Also during CP2, by the use of segmenting, the next word to be shifted, Vj1, and the next shift count, Vo1, will be transferred to the vector shift functional unit 110. On CP3 the shifted value of Vj0 will be transferred to the word Vi0 location of vector register Vi. Also on CP3, Vj1 will be shifted, and additional data Vj2 and Vo2 will be transferred to the vector shift functional unit 110. This process continues until all of the words Vj0–Vj127 of the vector register Vj have been shifted by amounts equal to the values of words Vo0–Vo127 respectively and transferred to the resultant vector register Vi.

Figure 4:
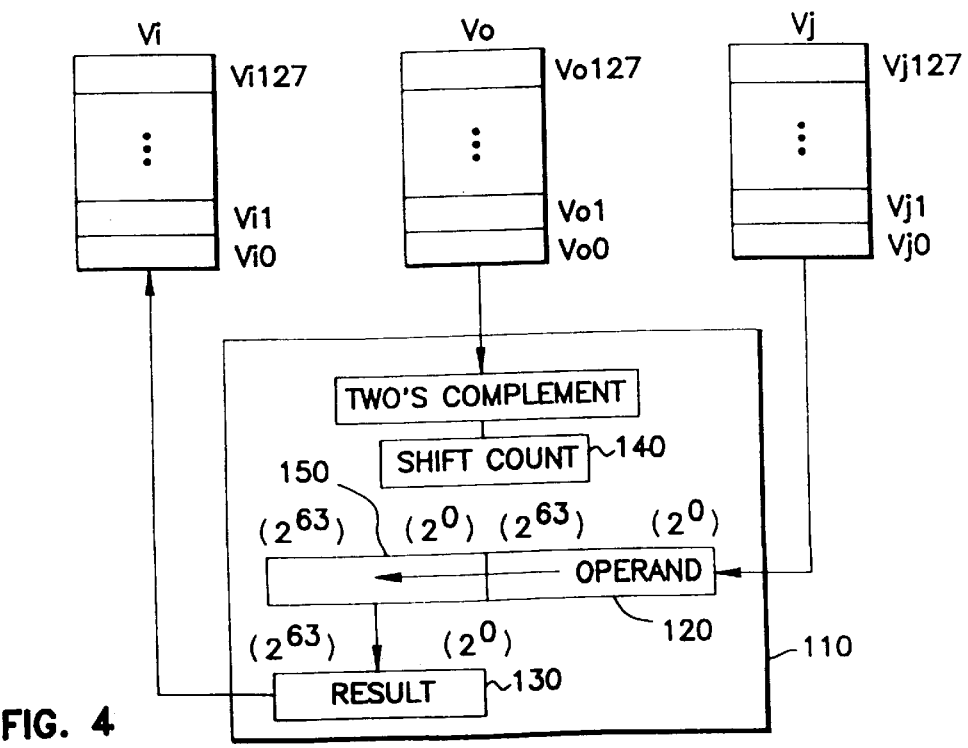
FIG. 4 is a block diagram of the conceptual operation of the vector shift by Vo shift count instruction for a right shift.

FIG. 4 shows the conceptual operation of instruction [2], the right vector shift by Vo shift count instruction. The same parameters are used with instruction [2]; words Vj0–Vj127 of vector register Vj are right shifted by amounts equal to the value of words Vo0–Vo127 respectively of vector register Vo, and the results are returned to vector register Vi. In order to maximize the efficiency of the hardware, a right shifted value is achieved by using left shifts by an amount equal to the two's complement of the shift count. For example, shift count Vo0 is transferred to the vector shift functional unit 110 through logic which converts it to a two's complement form, and this occurs one clock period before the first word Vj0 is transferred to the vector shift functional unit 110. When word Vj0 is transferred to the vector shift functional unit 110, it will initially be right shifted 64 places into register 120 so that the word Vj0 is effectively displaced by an amount equal to the length of a vector word. On the next clock period, additional logic in the vector shift functional unit 110 will left shift Vj0 into register 150 by an amount equal to the two's complement of Vo0 contained in register 140. After the shifting, on the next clock period, the shifted value in register 150 will be transferred through a register 130 to word Vi0 position of vector register Vi. Segmenting is again used throughout the process so that new data is transferred to the vector shift functional unit 110 on each clock period. The process continues until all words Vj0–Vj127 of vector register Vj have been right shifted and transferred to vector register Vi.

As an example to illustrate the right shift technique, consider shifting data bit ($2^{45}$) of register 120 to the right $20_{10}$ (0101002) places so that in the desired result, data bit ($2^{45}$) will be shifted to bit position ($2^{25}$). First, the two's complement of the shift count $20_{10}$ is calculated. The two's complement is achieved by inverting each bit of the number in binary form and then adding one, which, in the present case, results in a value of $44_{10}$. As seen by the following representation of the contents of registers 150 and 120, by using left shifts, bit position ($2^{45}$) of register 120 will be shifted to the left $44_{10}$ places into register 150, which is bit position ($2^2$) in register 150.

$$(2^{63} \ldots 2^{25} \ldots 2^0)_{reg.\ 150} \xleftarrow{left-shift} (2^{63} \ldots 2^{45} \ldots 2^0)_{reg.\ 120}$$

This is the same position as if bit position (245) were right shifted $20_{10}$ places.

For both the right and left shifts, only the lower six bits of a shift count constitute a valid shift. If all of the lower six bits of the shift count are set, and the other bits are equal to zero, the vector shift functional unit 110 will shift a data word 63 places. Since the data words are 64 bits long, any higher value of a shift count will result in a shifted value of zero. Therefore, if any of the upper 58 bits of the shift count are set, the result will be zero. The vector shift functional unit 110, upon receiving a shift count, will check the upper 58 bits ($2^6$–$2^{63}$) to determine if any of these bits are set. A zero result will be returned if any of these bits ($2^6$–$2^{63}$) are set. Since only the lower 6 bits ($2^0$–$2^5$) may specify a valid shift count, only bits ($2^0$–$2^5$) are used in the calculation of the two's complement for the right shift.

Figure 5:
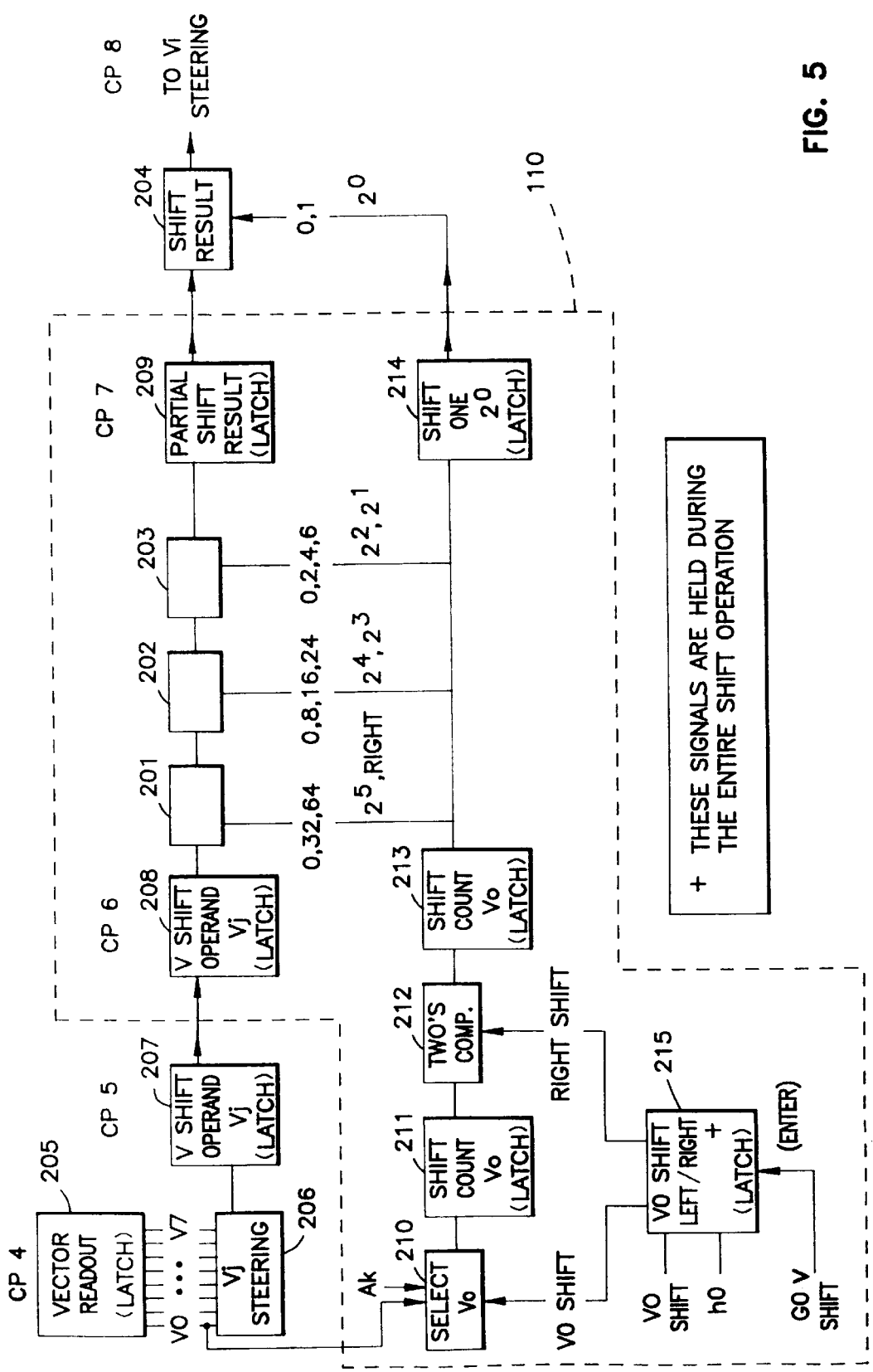
FIG. 5 is a detailed block diagram of the vector shift functional unit.

FIG. 5 shows a block diagram of the vector shift functional unit 110. For operation in a two pipe machine, this logic would be duplicated for the second pipe so that two operands would be shifted in parallel in the vector shift functional unit. Logic stages 201–204 perform the actual shifting of an operand. When a vector shift instruction [1] or [2] is executed, the GO V SHIFT signal initiates the process. The Vo SHIFT signal is used to indicate to the vector shift functional unit 110 that the shift count will be taken from vector register Vo instead of using a single value as the shift count for each word of a vector register. Thus, the Vo SHIFT signal also notifies the vector shift functional unit 110 that the shift count must be recalculated for each new operand from vector register Vj. The h0 signal determines if the operands will be shifted right or left. These control signals are held in logic 215 during the entire shift operation.

When a vector shift instruction is issued, vector register Vj containing the operands and vector register Vo containing the shift counts are readout. Shift counts from vector register Vo go directly through switch 210 to latch 211 of the vector shift functional unit 110. The Vo SHIFT signal directed to switch 210 instructs the vector shift functional unit 110 to receive a new shift count from vector register Vo for each operand from vector register Vj. In the alternative, a single shift count from an Ak register would be directed to latch 211, and all operands would be shifted by an amount equal to the value of the Ak register.

The operands from vector register Vj arrive at the vector shift functional unit 110 one clock period after the shift counts, since the operands are steered through logic 206 to latch 207 before entering the vector shift functional unit 110. Next, the operands are latched onto the vector shift functional unit 110, arriving at latch 208. The shift count for each operand is transferred through logic 212, which converts the shift count to a two's complement value if the h0 signal indicates that this is a right shift.

With the shift count held in latch 213, the operand will be transferred through shifting stages 201–203 (explained below) in one clock period, and the partial shift result will be held in latch 209. After the partial result leaves the vector shift functional unit 110, it will be transferred through one more shifting stage 204. The final result will then be steered to the destination vector register Vi.

FIG. 6 shows a representation of the paths through the shifting stages 201–204. Stages 202–204 always shift the operand left. Stage 201 may shift the operand left, or for a right shift, this stage contains the initial right shifting logic. A complete shift may be divided into smaller shifts in the shifting stages 201–204 so that the sum of all the smaller shifts will be equal to the shift count.

Figure 6A:
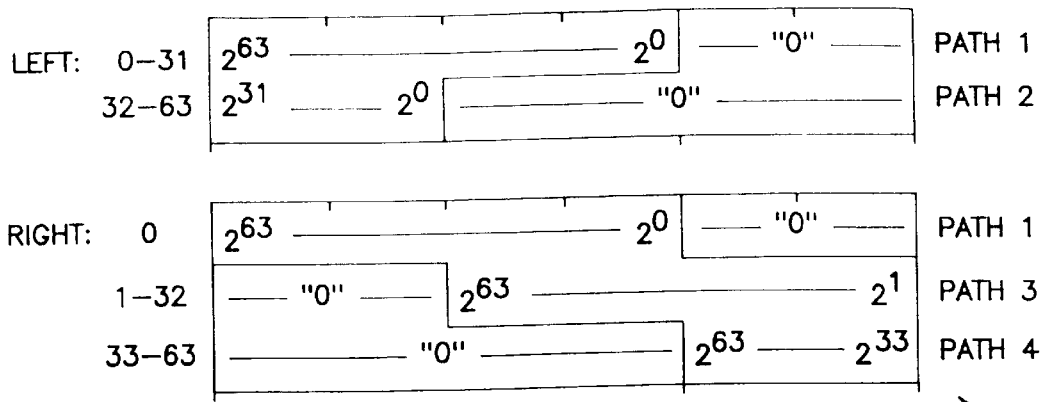
FIG. 6A is a diagram of the four paths through the first shifting stage of the vector shift functional unit.

Stage 201 is a 95-bit multiplexer for selecting one of the four paths shown in FIG. 6A. The path selected depends upon the value of bit ($2^5$) of the shift count and whether this is a right or left shift. If any bit above bit ($2^5$) in the shift count is set, no path will be enabled, resulting in an output of all zeroes from stage 201. Table 1 shows the amount by which the operand is shifted for each of the four paths and the determination by which a path is selected. For the right shift, the shift count evaluated at each of the shift stages 201–204 is the two's complement (2's comp.) value of the shift count received from vector register Vo.

TABLE 1

| PATH | OPERATION | SHIFT COUNT | |
|---|---|---|---|
| LEFT SHIFTS | | | |
| Path 1: | shift 0 | $00-37_8$ | |
| Path 2: | shift left 32 | $40_8-77_8$ | |

TABLE 1-continued

| PATH | OPERATION | SHIFT COUNT | |
|---|---|---|---|
| RIGHT SHIFTS | | | |
| Path 1: | shift 0 | 00 | (2's comp.) |
| Path 3: | shift right 32 | $77_8-40_8$ | (2's comp.) |
| Path 4: | shift right 64 | $37_8-01_8$ | (2's comp.) |

FIG. 6A shows diagrammatically the shifting process for the paths of stage 201.

Figure 6B:
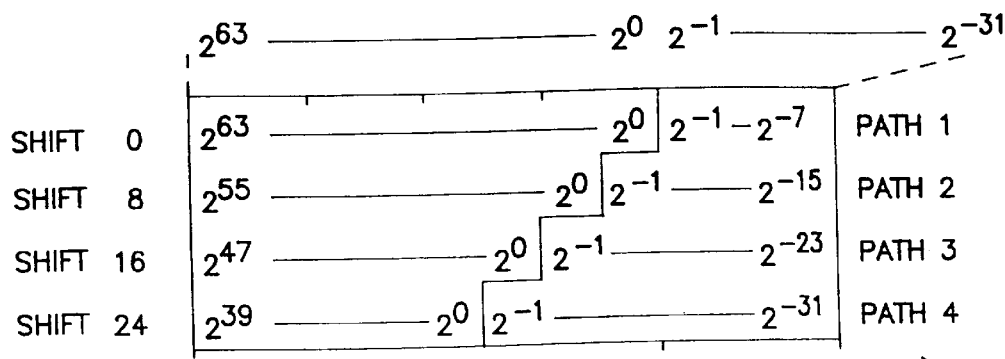
FIG. 6B is a diagram of the four paths through the second shifting stage of the vector shift functional unit.

Stage 202 is a 71-bit multiplexer for selecting one of four paths shown in FIG. 6B depending upon the value of shift count bits ($2^4$) and ($2^3$). Table 2 shows the amount by which the operand is shifted for each of the four paths and the determination by which a path is selected.

TABLE 2

| PATH | OPERATION | SHIFT COUNT |
|---|---|---|
| Path 1: | shift left 0 | bits $(2^4),(2^3) = 00$ |
| Path 2: | shift left 8 | bits $(2^4),(2^3) = 01_2$ |
| Path 3: | shift left 16 | bits $(2^4),(2^3) = 10_2$ |
| Path 4: | shift left 24 | bits $(2^4),(2^3) = 11_2$ |

FIG. 6B shows the shifting process for each of the four paths through stage 202.

Figure 6C:
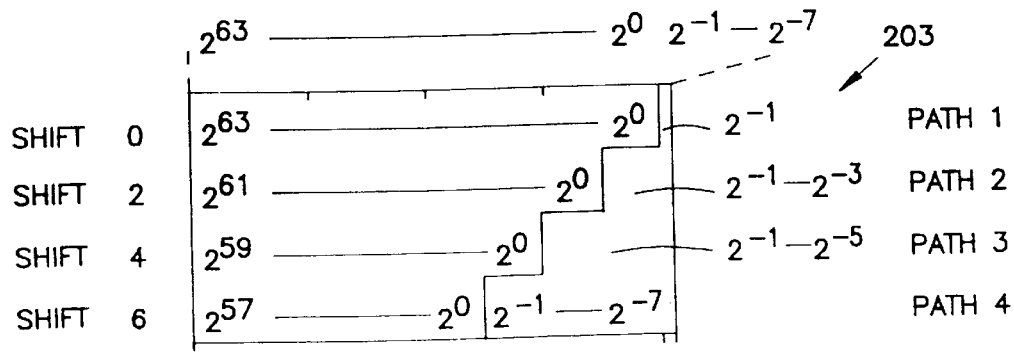
FIG. 6C is a diagram of the four paths through the third shifting stage of the vector shift functional unit.

Stage 203 is a 65-bit multiplexer for selecting one of four paths shown in FIG. 6C depending upon the value of shift count bits ($2^2$) and ($2^1$). Table 3 shows the amount by which the operand is shifted for each of the four paths and the determination by which a path is selected.

TABLE 3

| PATH | OPERATION | SHIFT COUNT |
|---|---|---|
| Path 1: | shift left 0 | bits $(2^2),(2^1) = 00$ |
| Path 2: | shift left 2 | bits $(2^2),(2^1) = 01_2$ |
| Path 3: | shift left 4 | bits $(2^2),(2^1) = 10_2$ |
| Path 4: | shift left 6 | bits $(2^2),(2^1) = 11_2$ |

FIG. 6C shows the shifting process for each of the four paths through stage 202.

Figure 6D:
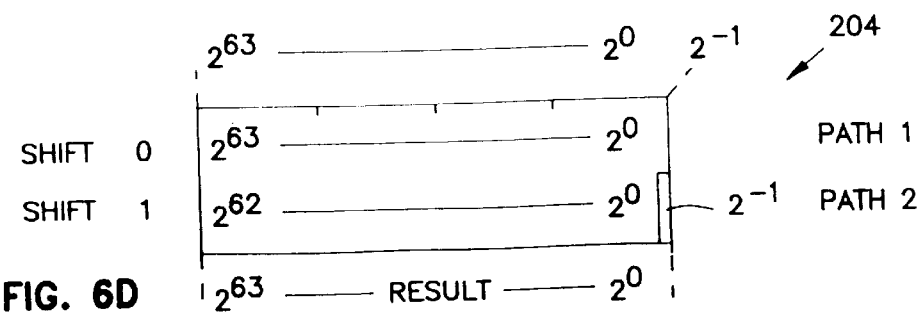
FIG. 6D is a diagram of the two paths through the fourth shifting stage of the vector shift functional unit.

Stage 204 is a 64-bit multiplexer for selecting one of two paths shown in FIG. 6D depending upon the value of shift count bit ($2^0$). This is simply a shift of one and is performed after the operand has left the vector shift functional unit 110. Table 4 shows the amount by which the operand is shifted for each of the two paths and the determination by which a path is selected.

TABLE 4

| PATH | OPERATION | SHIFT COUNT |
|---|---|---|
| Path 1: | shift left 0 | bit $(2^0) = 0$ |
| Path 2: | shift left 1 | bit $(2^0) = 1$ |

FIG. 6D shows the shifting process for both paths through stage 202.

The vector shift functional unit 110 contains a latch on both ends of the operand path so that the data may be segmented. For example, as one operand is transferred through shift stages 201–203, which requires one clock period, another operand may be transferred to the vector shift functional unit 110 into latch 208. By dividing the entire shift process into smaller shifts, the circuitry of the vector shift functional unit 110 eliminates any variance which would depend upon the amount of a particular shift, since each operand is transferred through the entire process of shift stages 201–204. Therefore, without any variance, there is no need to make timing corrections, and the data may be segmented, which increases the rate by which results are received. This maximizes the efficiency of the vector shift hardware in the vector shift functional unit 110.

Figure 7:
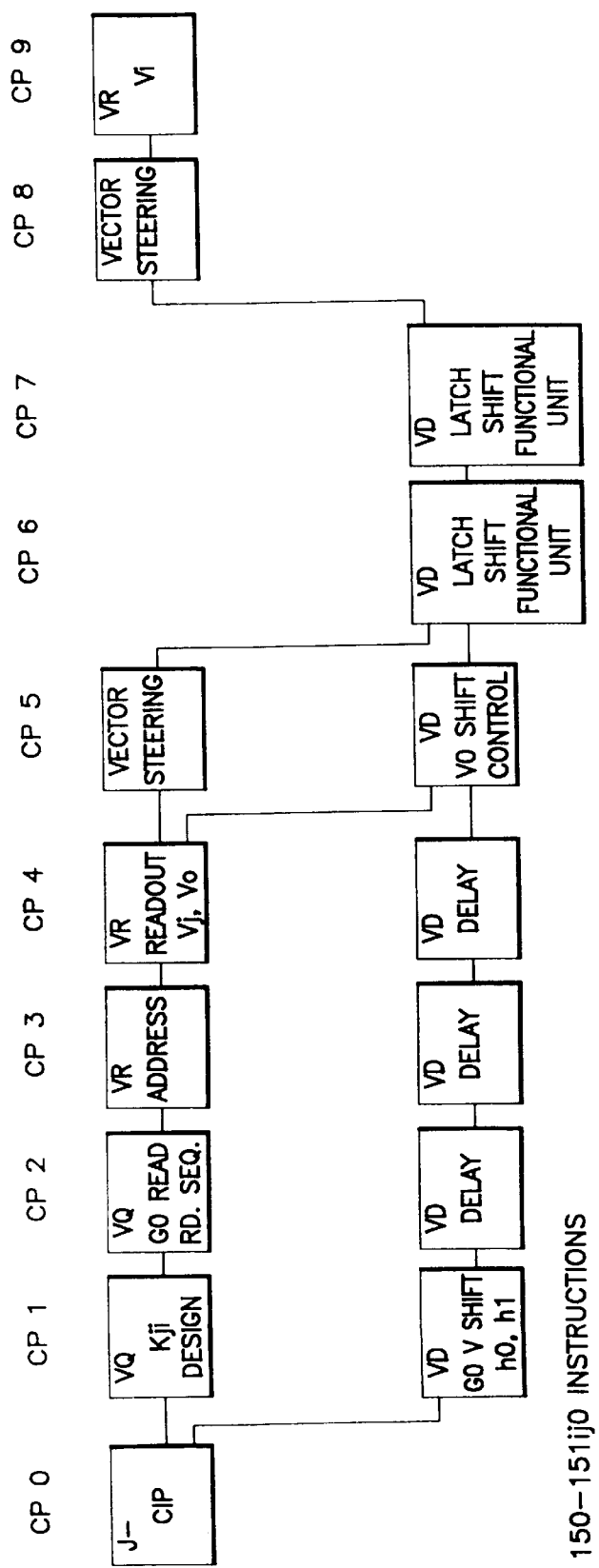
FIG. 7 is a timing diagram showing the sequential operation of the vector shift functional unit circuitry for the vector shift by Vo shift count instruction.

FIG. 7 is a timing diagram showing the sequential operation of the vector shift functional unit for the vector shift by Vo shift count instruction. The clock periods (CP) are shown at the top of FIG. 7 with time increasing to the right. The corresponding clock periods are also shown at the top of FIG. 5, the block diagram for the vector shift functional unit. In clock period 0, the instruction is issued as the current instruction parcel (CIP).

In the first four clock periods CP1–CP4, the processor fans out control signals. The GO V SHIFT signal is issued to the vector shift functional unit in clock period 1. In clock period 2, vector register control initiates a GO READ signal, which will establish a link with the source vector register Vj. In clock period 3, the memory address of the vector register Vj is issued. In clock period 4, an operand and shift count are readout from vector registers Vj and Vo respectively.

The operand from vector register Vj, in clock period 5, is steered through a multiplexer to the appropriate functional unit. In this case, it is steered to the vector shift functional unit. Also in clock period 5, the Vo SHIFT signal is issued, and a shift count from the vector register Vo is directed to the vector shift functional unit.

In clock periods 6 and 7, the operand is on the vector shift functional unit. The actual shifting of the operand only requires one clock period in the vector shift functional unit. However, since there is a latch on both ends of the vector shift functional unit, which are used for segmenting, two clock periods are required to send an operand through the vector shift functional unit.

In clock period 8, the shifted operand is steered to the appropriate destination vector register Vi. And, in clock period 9, the result arrives at vector register Vi. As previously explained, the entire process as executed by the vector shift by Vo shift count instruction is segmented. Therefore, all 128 elements of vector register Vj can be shifted by the shift counts in vector register Vo, and the results returned to vector register Vi, in 136 clock periods for a single pipe machine or 72 clock periods for a two pipe machine.

VECTOR WORD SHIFT

The vector word shift is another mode of expanded operation of the vector shift functional unit which allows for greater data manipulation. The vector word shift achieves an efficient method and apparatus for shifting a predetermined number of words in a vector register to different word locations in the same or another vector register. For certain operations, an example of which is explained below, the increased degree of data manipulation derived from the ability to shift entire words to different vector word locations decreases execution time and memory fetches.

The following is the opcode in CAL for the vector word shift instruction.

005400 152$ijk$ Vi, Vj     [4]

In the instruction, i represents bits ($2^6$–$2^8$), which indicate the destination vector register, and j represents bits ($2^3$–$2^5$), which indicate the source vector register. It is possible to set i equal to j in instruction [4] so that the source vector register Vj equals the destination vector register Vi. The Ak register, as indicated by k in the instruction, specifies the first word shifted.

Figure 8:
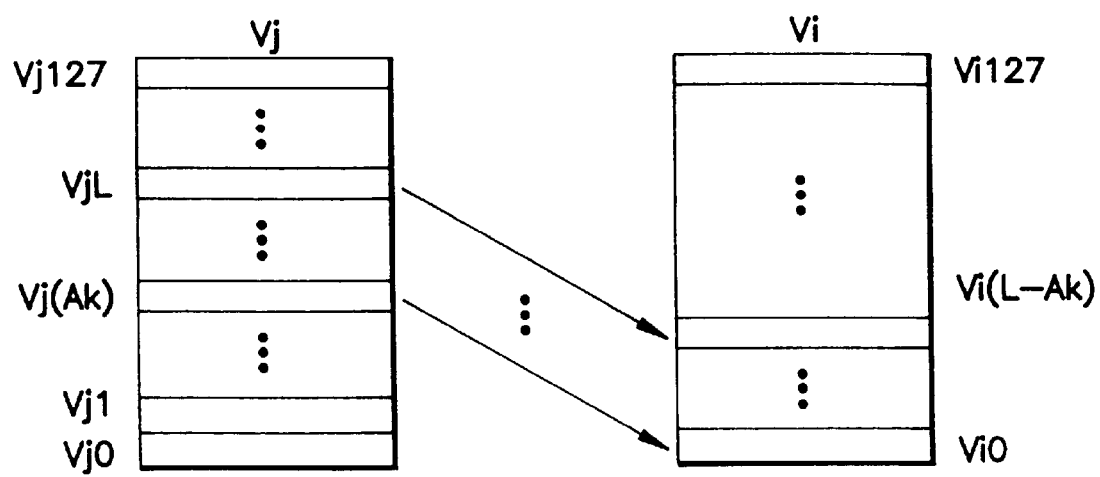
FIG. 8 is a block diagram of the conceptual operation of the vector word shift instruction.

FIG. 8 shows the conceptual operation of the vector word shift instruction. Words from vector register Vj are sequentially transferred to the vector shift functional unit beginning with word Vj0. These words are discarded from the vector shift functional unit until word Vj(Ak) is transferred. The value of the Ak register specifies the location of word Vj(Ak) in vector register Vj. Word Vj(Ak) is transferred to word Vi0 location of vector register Vi. A predetermined number of words subsequent to word Vj(Ak) in vector register Vj are transferred to the sequential word locations following word Vi0 of vector register Vi.

The predetermined number of words transferred from vector register Vj to vector register Vi is determined by the value of the vector length register VL, which controls the length of a vector instruction. As each word is transferred from vector register Vj to the vector shift functional unit, the vector length register VL counts down. When VL is equal to zero, a VL control chip sends a release signal which terminates the instruction. Therefore, since register Ak specifies the first word transferred to vector register Vi and, register VL specifies the length of the instruction, the number of words transferred to vector register Vi is equal to the difference between the values of the VL and Ak registers (VL–Ak).

Timing signals directed to the vector shift functional unit control the vector word shift process. When words from vector register Vj are sent to the vector shift functional unit, timing signals control when the vector shift functional unit will begin writing the words to vector register Vi. Another control signal, the RELEASE signal, will determine when the instruction will terminate and the vector shift functional unit will stop writing words to vector register Vi. Since there is no bit shifting involved in the vector word shift process, words from vector register Vj bypass the shifting logic (see FIG. 5, stages 201–204) in the vector shift functional unit.

Figure 9:
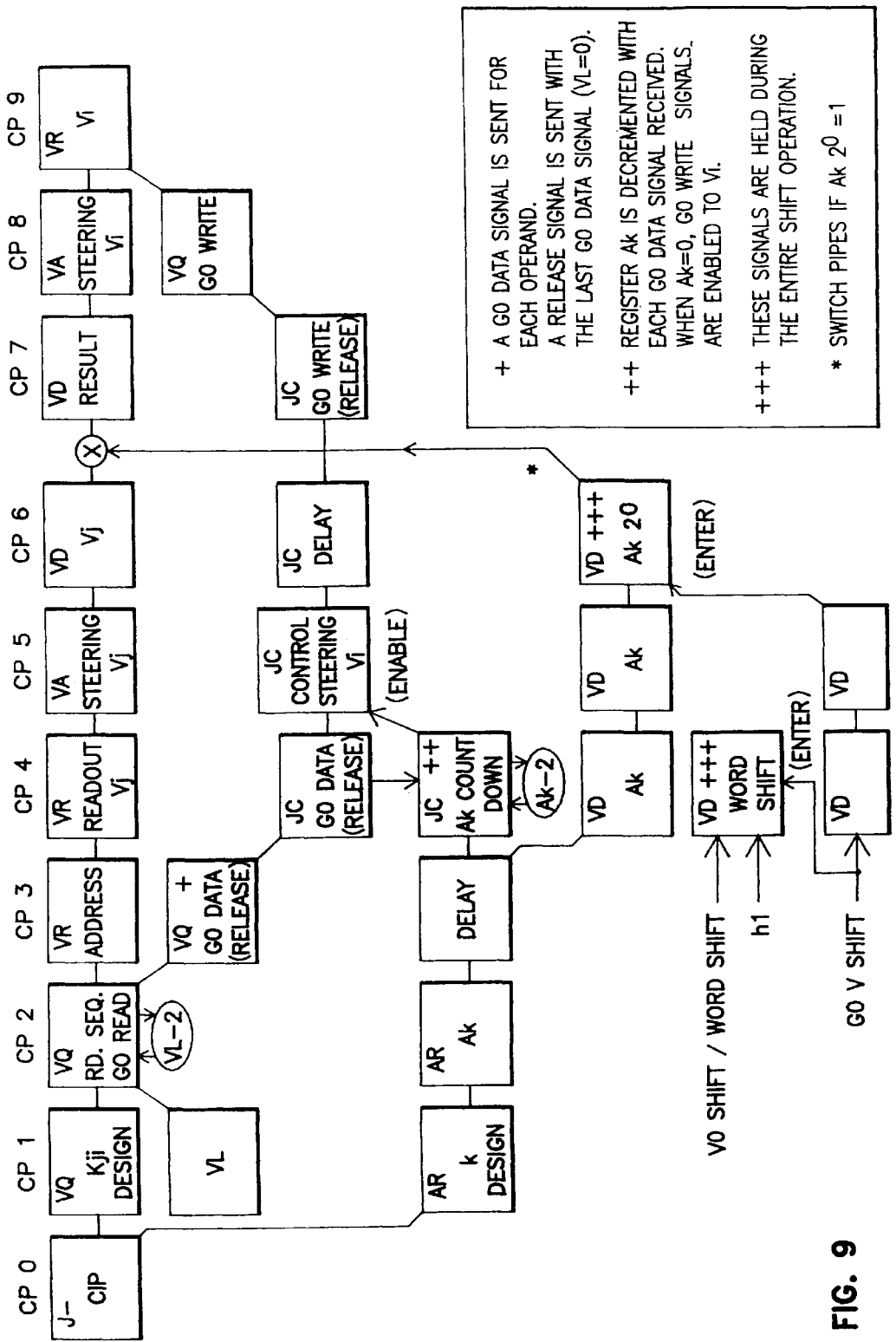
FIG. 9 is a timing diagram showing the sequential operation of the vector shift functional unit circuitry for the vector word shift instruction.

FIG. 9 is a timing diagram showing the sequential operation of the vector shift functional unit for the vector word shift instruction. The clock periods (CP) are shown at the top of FIG. 9 with time increasing to the right. In clock period 0, the instruction is issued as the current instruction parcel (CIP).

In the first four clock periods CP1–CP4, the processor fans out control signals. In clock period 2, vector register control initiates a GO READ signal, which will establish a link with the source vector register Vj. The VL register begins counting down in clock period 2 and will count down for each operand sent to the vector shift functional unit from vector register Vj.

In clock period 3, the memory address of the vector register Vj is issued. Also, as shown in clock period 3, a GO DATA signal is sent to the vector shift functional unit with each operand, which is a handshaking process informing the vector shift functional unit that an operand is being sent.

In clock period 4, an operand is readout from vector register Vj, and the GO V SHIFT and h1 signals are issued to the vector shift functional unit. The h1 signal determines whether the vector shift functional unit will perform a vector word shift or vector word shift by Vo shift count instruction. The Ak register begins counting down in clock period 4 and counts down in response to a GO DATA signal sent with each operand to the vector shift functional unit.

The operand from vector register Vj, in clock period 5, is steered through a multiplexer to the appropriate functional unit, which, in this case, is the vector shift functional unit. Clock period 5 also shows the enable signal path to the control steering Vi circuitry. While register Ak does not equal zero, the control steering Vi circuity is disabled so that the operands from vector register Vj are not written to vector register Vi.

In clock periods 6 and 7, the operand from vector register Vj is on the vector shift functional unit. The GO WRITE signals are inhibited while register Ak does not equal zero. When register Ak reaches zero, the control steering Vi circuitry is enabled and GO WRITE signals are generated.

In response to each GO WRITE signal generated by the vector shift functional unit, each operand subsequently transferred from vector register Vj is steered through a multiplexer to vector register Vi, as shown in clock period 8. The operands from vector register Vj are written to vector register Vi until the vector length register VL is equal to zero. When VL is equal to zero, a RELEASE signal is sent to the vector shift functional unit with the last GO DATA signal (see clock period 3). The RELEASE signal terminates the process after the operand associated the last GO DATA signal is sent to the vector shift functional unit.

Figure 10:
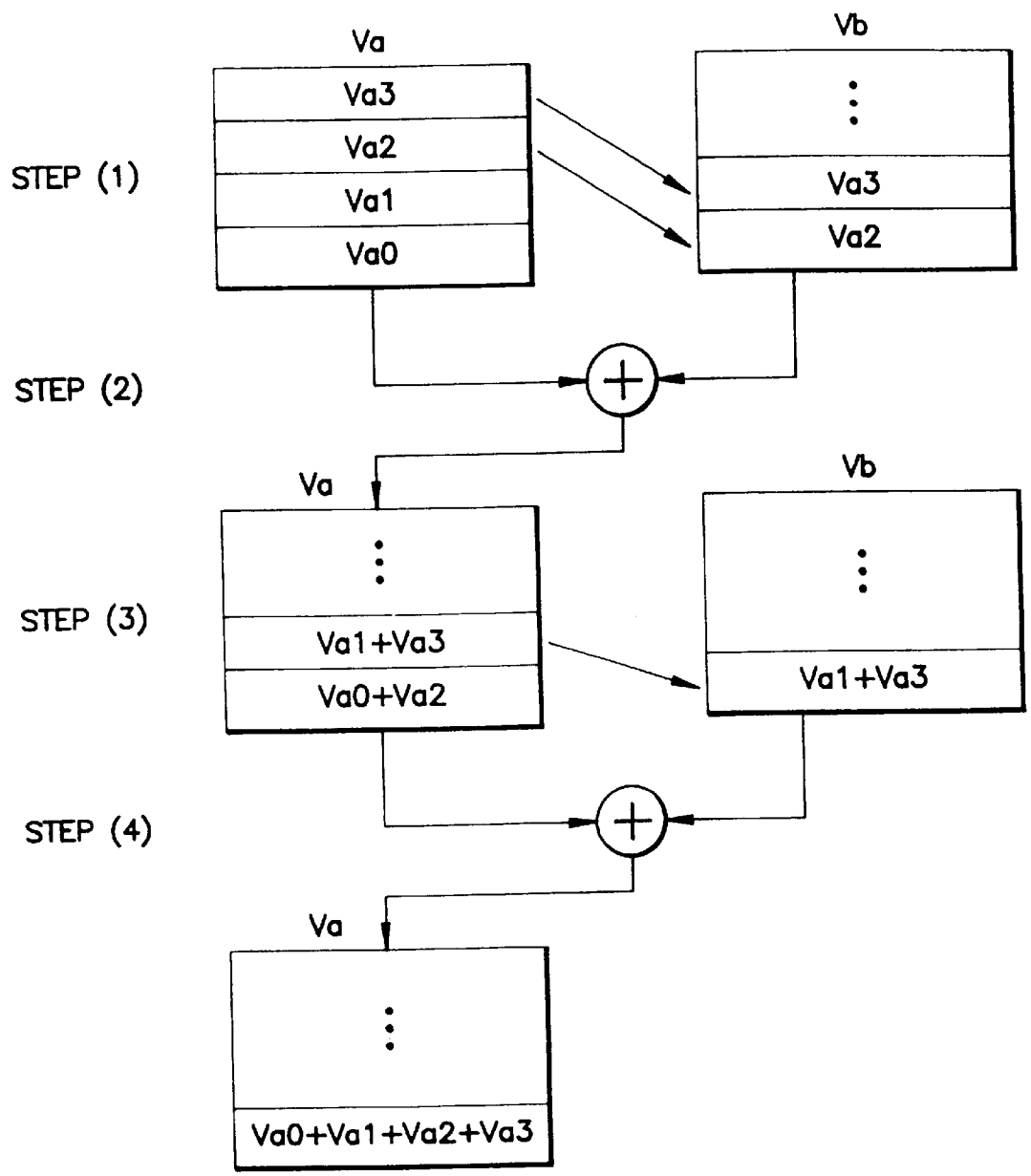
FIG. 10 is a block diagram of one application of the vector word shift instruction.

A practical application of the vector word shift instruction is in the summation of all words of a vector register. As an example, consider summing the words (Va0–Va3) of a 4-word vector register Va shown in FIG. 10. Using the vector word shift instruction, the two words (Va2 and Va3) in the top half of vector register Va are shifted to the bottom half of vector register Vb, as shown in STEP (1) of FIG. 10. Next, vector registers Va and Vb are added together in STEP (2) so that the first and second words of vector register Va are equal to Va0+Va2 and Va130 Va3 respectively. As shown in STEP (3), the shifting process is repeated with the second word of vector register Va being shifted to the first word location of vector register Vb. Vector registers Va and Vb are again added together in STEP (4) so that the first word of vector register Va is equal to Va0+Va1+Va2+Va3, which is the summation of all the original words of the vector. This process may easily be extended to vectors with a greater number of words.

The summation of all the words of a vector register is efficiently achieved with the use of the vector word shift instruction. Without the vector word shift instruction, data would need to be repeatedly fetched from memory during the summation process. Therefore, the vector word shift instruction significantly reduces the memory traffic during the summation process.

While the present invention has been described in connection with the preferred embodiment thereof, it will be understood that many modifications will be readily apparent to those skilled in the art, and this application is intended to cover any adaptations or variations thereof. For example, vector registers of different word lengths or with a different number of words in the vector registers may be used without departing from the scope of the invention.

It is manifestly intended that this invention be limited only by the claims and equivalents thereof.

What is claimed is:

1. A pipelined vector register computer, comprising:

a first vector register for holding a plurality of words, a portion of which are to be moved;

a second vector register for receiving the portion of words to be moved;

a location register for specifying a location within the first vector register where the portion of words to be moved begins;

a counter for specifying the number of words in the portion of words to be moved;

a vector shift functional unit; and control means, connected to the first vector register, the second vector register, the location register, the counter and the vector shift functional unit, for sequentially transferring the portion of words to the vector shift functional unit;

wherein the vector shift functional unit operates to sequentially receive words from the first vector register, to discard those words received from the first vector register which are not within the portion of words to be moved and to move words which are not discarded to sequential locations in the second vector register beginning at a fixed first location.

2. A pipelined vector register computer, comprising:

a vector register for holding a plurality of words, a portion of which are to be moved, and for receiving the portion of words to be moved;

a location register for specifying the location within the vector register where the portion of words to be moved begins;

a counter for specifying a number of words in the portion of words to be moved;

a vector shift functional unit; and control means, connected to the vector register, the location register, the counter and the vector shift functional unit, for sequentially transferring the portion of words to the vector shift functional unit;

wherein the vector shift functional unit operates to sequentially receive words from the vector register, to discard those words received from the vector register which are not within the portion of words to be moved and to move words which are not discarded to sequential locations in the vector register beginning at a fixed first location.

3. A pipelined vector register computer, comprising:

a first vector register for holding a plurality of words, a portion of which are to be moved;

a second vector register for receiving the portion of words to be moved;

a location register for specifying a location within the first vector register where the portion of words to be moved begins;

a counter for specifying the number of words in the portion of words to be moved;

a vector shift functional unit; and control means, connected to the first vector register, the second vector register, the location register, the counter and the vector shift functional unit, for sequentially transferring the portion of words to the vector shift functional unit;

wherein the vector shift functional unit operates to sequentially receive words from the first vector register, to discard those words received from the first vector register which are not within the portion of words to be moved and to move words which are not discarded to sequential locations in the second vector register, wherein the vector shift functional unit operates to inhibiting a GO WRITE signal when it is discarding elements, and, when moving words not discarded, to simultaneously generate the GO WRITE signal.

4. A pipelined vector register computer, comprising:

a vector register for holding a plurality of words, a portion of which are to be moved, and for receiving the portion of words to be moved;

a location register for specifying the location within the vector register where the portion of words to be moved begins;

a counter for specifying a number of words in the portion of words to be moved;

a vector shift functional unit; and control means, connected to the vector register, the location register, the counter and the vector shift functional unit, for sequentially transferring the portion of words to the vector shift functional unit;

wherein the vector shift functional unit operates to sequentially receive words from the vector register, to discard those words received from the vector register which are not within the portion of words to be moved and to move words which are not discarded to sequential locations in the vector register, wherein the vector shift functional unit operates to inhibiting a GO WRITE signal when it is discarding elements, and, when moving words not discarded, to simultaneously generate the GO WRITE signal.

5. A pipelined vector register computer, comprising:

a first vector register that holds a plurality of words, a portion of which are to be moved;

a second vector register that receives the portion of words to be moved;

a location register that specifies a location within the first vector register where the portion of words to be moved begins;

a counter that specifies the number of words in the portion of words to be moved;

a vector shift functional unit; and a control apparatus, connected to the first vector register, the second vector register, the location register, the counter and the vector shift functional unit, that sequentially transfers the portion of words to the vector shift functional unit;

wherein the vector shift functional unit operates to sequentially receive words from the first vector register, to discard those words received from the first vector register which are not within the portion of words to be moved and to move words which are not discarded to sequential locations in the second vector register beginning at a fixed first location.

6. A pipelined vector register computer, comprising:

a vector register that holds a plurality of words, a portion of which are to be moved, and that receives the portion of words to be moved;

a location register that specifies the location within the vector register where the portion of words to be moved begins;

a counter that specifies a number of words in the portion of words to be moved;

a vector shift functional unit; and a control apparatus, connected to the vector register, the location register, the counter and the vector shift functional unit, that sequentially transfers the portion of words to the vector shift functional unit;

wherein the vector shift functional unit operates to sequentially receive words from the vector register, to discard those words received from the vector register which are not within the portion of words to be moved and to move words which are not discarded to sequential locations in the vector register beginning at a fixed first location.

* * * * *